Figure 1:
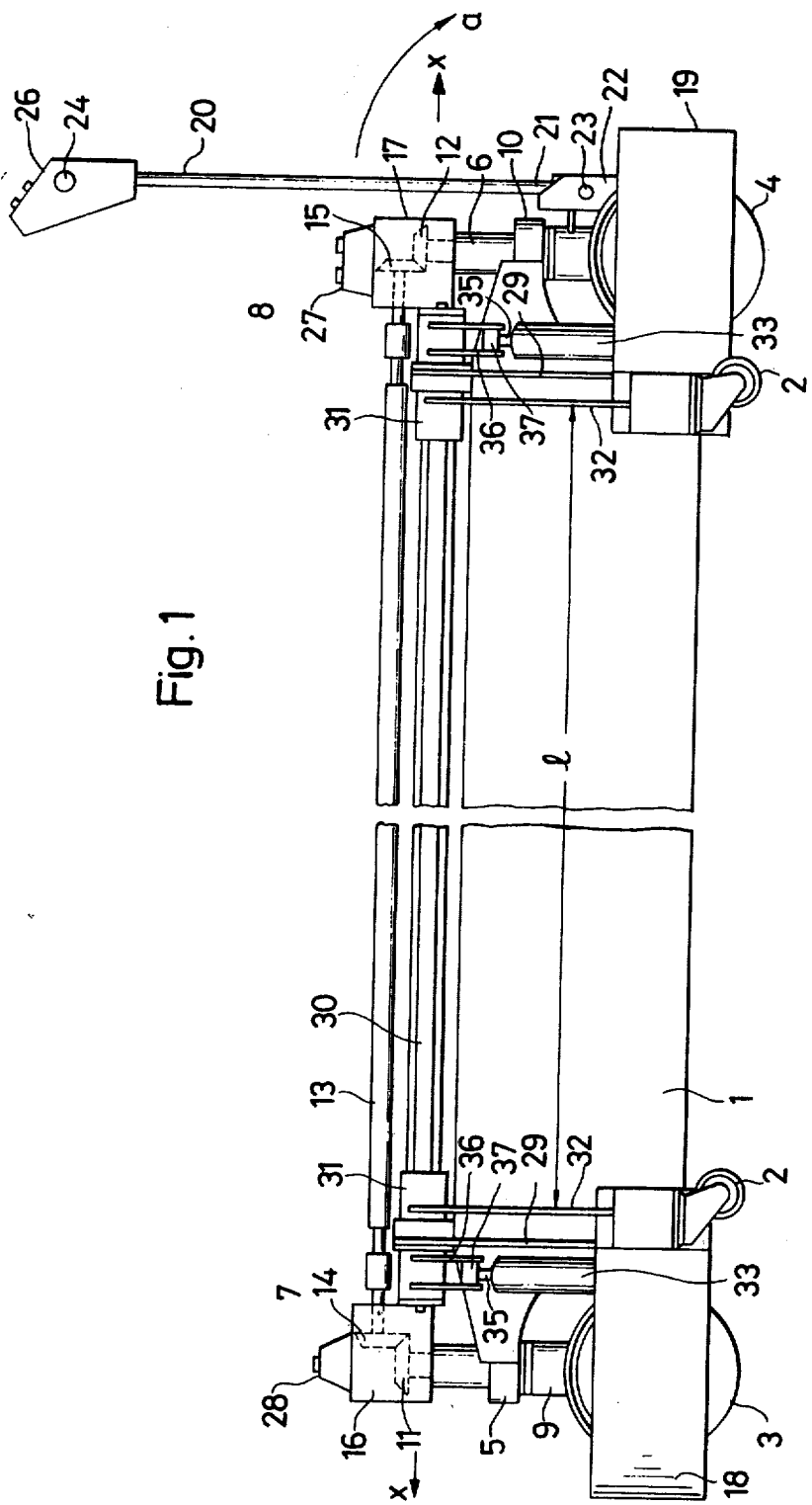

United States Patent [19]

Suzuki

[11] 3,887,095
[45] June 3, 1975

[54] POWER-OPERATED VEHICLE

[75] Inventor: Seiichi Suzuki, Shiga, Japan

[73] Assignee: Todo Seisakusho Ltd., Kyoto-shi, Japan

[22] Filed: June 24, 1974

[21] Appl. No.: 482,411

[30] Foreign Application Priority Data
Mar. 18, 1974 Japan.............................. 49-31457

[52] U.S. Cl................ 214/130 R; 180/6.24; 180/52; 180/65 R
[51] Int. Cl.............................................. B60p 1/16
[58] Field of Search............ 180/52, 48, 65 R, 65 F, 180/65 A, 6.24; 214/1 D, DIG. 3, DIG. 4, 130 R, 130 C, 77 R; 187/9; 254/2 R

[56] References Cited
UNITED STATES PATENTS

| | | | |
|---|---|---|---|
| 2,513,718 | 7/1950 | Gfrorer...................... | 180/65 R |
| 2,645,297 | 7/1953 | Wennberg et al................ | 180/65 R |
| 2,792,134 | 5/1957 | Kinnee...................... | 214/77 R |
| 3,031,024 | 4/1962 | Ulinski...................... | 180/52 X |
| 3,057,426 | 10/1962 | Hastings, Jr.................... | 180/52 UX |
| 3,259,258 | 7/1966 | Fisher...................... | 214/130 R |
| 3,667,632 | 6/1972 | Tidswell...................... | 214/130 R |

FOREIGN PATENTS OR APPLICATIONS
1,954,704   5/1971   Germany...................... 214/DIG. 4

*Primary Examiner*—Kenneth H. Betts
*Assistant Examiner*—Milton L. Smith
*Attorney, Agent, or Firm*—Kurt Kelman

[57] ABSTRACT

A power-operated pick-up truck for transporting a beam comprises a base having a quadrangular wheeled support consisting of independently driven front and rear wheels and freely rotatable rollers laterally offset from the wheels. Support shafts mount the wheels on the base for pivoting about a vertical axis and a connector bar interconnects the shafts for pivoting them in unison. A steering shaft is connected to one support shaft for pivoting it in a direction transverse to the vertical axis thereof. The steering shaft carries a brake control as well as controls for the forward, reverse, high and low speed motions of the wheels. Another control for the forward and reverse motion of the wheel supported by the other support shaft in low speed motion is associated with the other shaft. A pair of beam support arms is mounted on the vehicle base for relative movement in respect to each other along a horizontal axis and hydraulic jacks pivot the support arms about this axis. The beam is received and supported in recesses at the free ends of the arms.

6 Claims, 5 Drawing Figures

POWER-OPERATED VEHICLE

The present invention relates to improvements in a power-operated vehicle for transporting a beam.

The vehicle comprises a base having a front and rear portion and which preferably has the form of an inverted channel member. The vehicle base runs on a quadrangular wheeled support consisting of a front wheel at the front portion of the vehicle base, a rear wheel at the rear portion thereof and freely rotatable rollers mounted on the vehicle base laterally offset from the front and rear wheels. The front and rear wheels are independently driven by independent electric motors powered by battery means mounted on the base. Support shafts pivotal about a vertical axis mount the front and rear wheels on the base for pivoting the wheels about the vertical axis whereby the vehicle base is steered in the direction of wheel pivoting. A connector bar interconnects the support shafts for pivoting the shafts in unison, the interconnection preferably comprising bevel gear means interconnecting the respective ends of the connector bar to the pivotal support shafts. A steering shaft is operatively connected to one of the support shafts, preverably the shaft mounting the rear wheel on the base, for pivoting the shaft in a direction transverse to the vertical axis thereof. A braking control means for the driven wheels is carried by the steering shaft as well as control means for controlling forward and reverse motion as well as high and low speed motion of the wheels. Another control means is operatively associated with the other support shaft for controlling the forward and reverse motion of the wheel supported by the other support shaft in low speed motion. A pair of beam support arms are mounted on the vehicle base for relative movement in respect of each other along a horizontal axis extending in the same direction as the connector bar. Each beam support arm has a free end defining a recess for receiving and supporting a beam to be transported upon movement of the support arms in respect of each other in correspondence to the length of the beam. Hydraulic jack means pivots the support arms about the horizontal axis and a control lever operates the hydraulic jack means.

Figure 2:
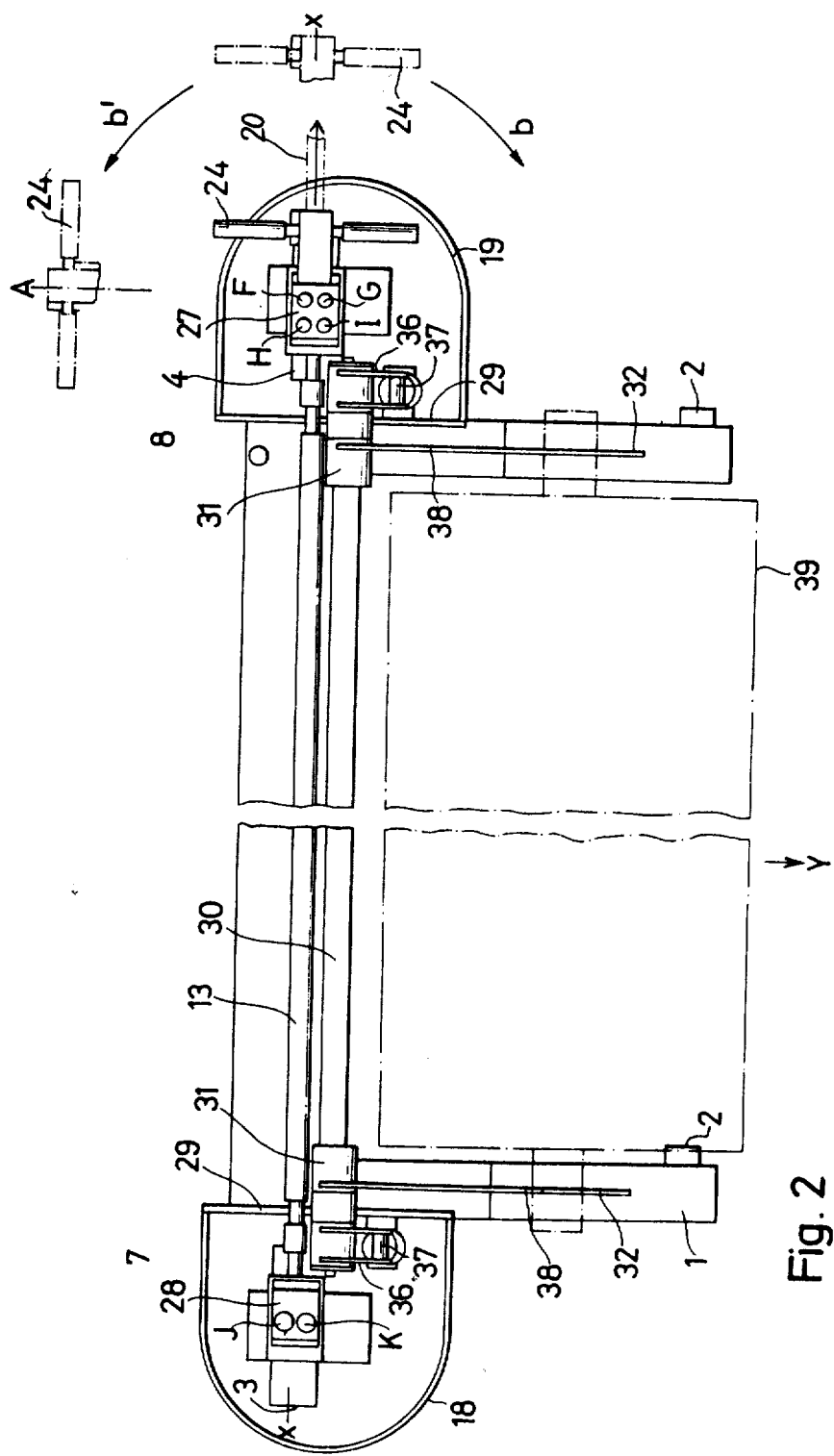
Figure 3:
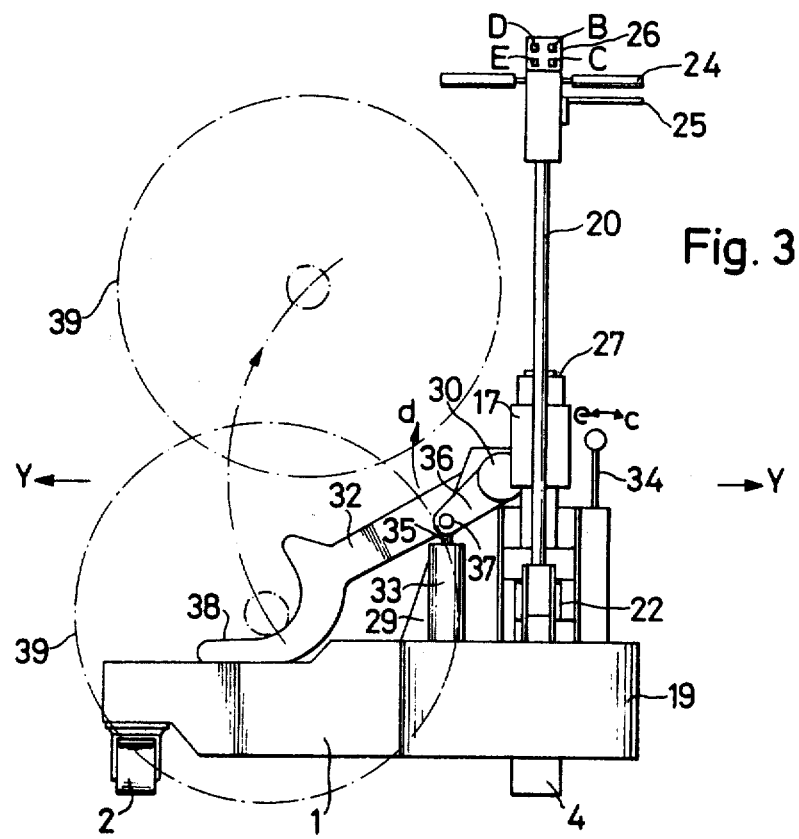
Figure 5:
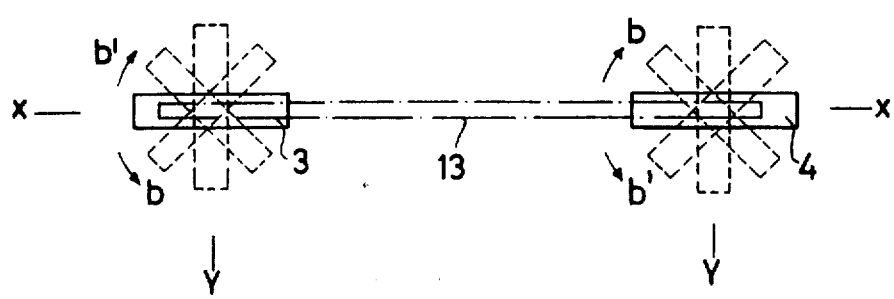
Figure 4:
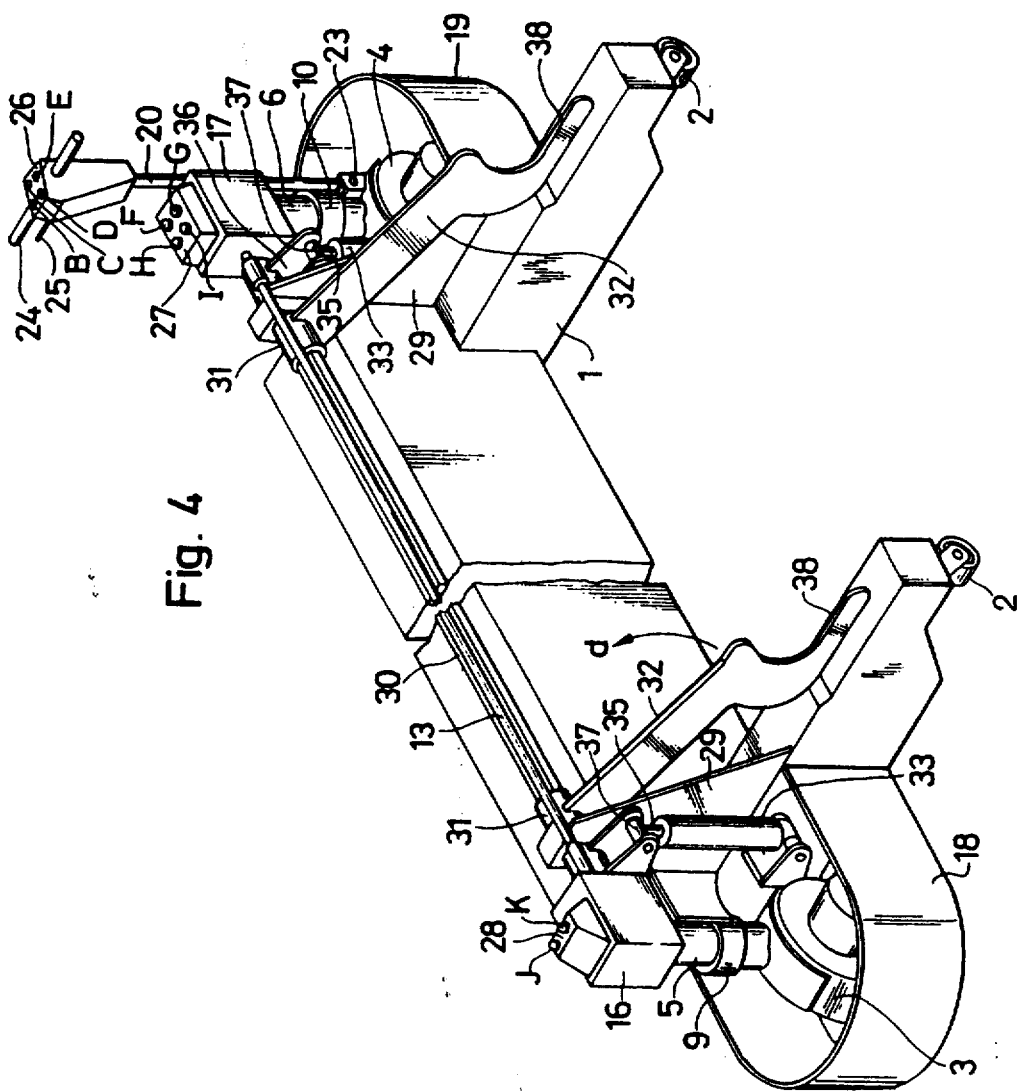

The above features and the advantages of combining them will become more apparent from the following detailed description of a now preferred embodiment of this invention, taken in conjunction with the accompanying drawing wherein FIG. 1 is a side elevational view of a power-operated beam transporting vehicle according to the invention, FIG. 2 is a top plan view thereof, FIG. 3 is an end view of the vehicle, FIG. 4 is a perspective view thereof and FIG. 5 illustrates the steering movements of the front and rear wheels of the vehicle.

Referring now to the drawing, the vehicle is shown to comprise base 1 having the shape of an inverted channel member and running on a quadrangular wheeled support consisting of front wheel 3, rear wheel 4 and freely rotatable rollers 2, 2 mounted on the vehicle base laterally offset from the front and rear wheels. The rollers swivel freely about a vertical axis. The front wheel is at a front portion 7 of the base and the rear wheel is at a rear portion 8 of the base, and both wheels are independently driven by respective driving motors (not shown). Preferably, electric motors are used and batteries mounted on the vehicle base are connected to the motors to supply power thereto and to permit independent operations thereof.

Vertical support shafts 5, 6 are pivotally journaled in bearings 9, 10 carried by brackets extending from vehicle base 1 and mount front and rear wheels 3, 4 on the base for pivoting the wheels about a vertical axis whereby the vehicle base may be steered in the direction of the pivoting of the driven wheels.

Connector bar 13 interconnects the support shafts for pivoting the shafts in unison when one shaft is pivoted. The interconnection between a respective end of the connector bar and the support shaft associated therewith comprises meshing bevel gears 11, 14 and 12, 15 secured respectively to the ends of the connector bar and the upper ends of the support shafts, the two sets of gears being mounted in respective gear boxes 16 and 17. U-shaped guard plates 18, 19 are mounted on side plates 29 of the vehicle base to enclose and protect the front and rear wheels.

Steering of the vehicle is effectuated in the following manner:

Steering shaft 20 is mounted in bearing 22 secured to support shaft 6, the lower end 21 of shaft 20 being mounted in the bearing by horizontally extending pivot pin 23 so as to permit the steering shaft to be pivoted from a vertical to a horizontal position in the direction of arrow $a$ (see FIG. 1). After the steering shaft has been pivoted out of its vertical position, it may be swung in a direction transverse to the vertical axis of the support shaft by a desired angle in the directions of arrows $b$ and $b'$ (see FIG. 2). The resultant pivoting of support shaft 6 about its vertical axis is transmitted by gears 12, 15, connector bar 13 and gears 11, 14 to support shaft 5 so that the front wheel is pivoted in unison with the rear wheel when steering shaft 20 is operated. Thus, as can be seen from FIG. 5, when shaft 20 is swung through an angle of 90° in respect to horizontal axis X—X in the direction of arrow $b'$ to point A (see FIG. 2), front and rear wheels 3 and 4 will also be pivoted from position X—X to position Y—Y. In other words, the vehicle will be steered in a direction 90° removed from, or perpendicular to, the initial direction. Of course, any direction in between these two directions may be chosen by suitable movement of the steering shaft about the desired steering angle.

The top of steering shaft 20 carries handle 24 enabling an operator to grasp the shaft for easy control thereof and braking control lever 25 for braking the driven wheels. As best shown in FIG. 3, handle 24 and lever 15 may be grasped together in the hand of an operator and when the operator pivots or pulls the brake control lever towards handle 24, the brakes will be released and the driving motors for the front and rear wheels may be coupled to the wheels. When lever 25 is released again, the drive will be discontinued and the vehicle braked.

Control means is carried by steering shaft 20 for controlling forward and reverse motion as well as high and low speed motion of the front and rear wheels. The illustrated control means comprises panel 26 mounted on the steering shaft and push buttons B, C, D and E mounted thereon to control the drive, button B controlling forward movement in the direction of axis X—X, button C controlling reverse movement in this direction, button D controlling the rotation of the driven wheels into a lower speed and button E controlling their rotation to a higher speed.

Another panel 27 is mounted on gear box 17 for rear wheel 4 and carries push buttons F, G, H and I for controlling the driving and braking of the rear and front wheels in forward and reverse directions. These buttons are adapted for use in a position of the front and rear wheels when they have been steered from the direction X—X to direction Y—Y. The push buttons may be so operated that the forward and backward rotation of the front and rear wheels may be controlled and/or stopped independently so that the vehicle may be steered along a curved path.

Another control means is operatively associated with the other support shaft 5, being mounted on gear box 16 for controlling forward and reverse motion of front wheel 3 in low speed motion. This other control means comprises panel 28 carrying push buttons J and K for controlling the fine adjustment of the rotation of the front wheel forwardly and in reverse. By pushing buttons J and K, the front wheel alone may be rotated in low speed.

All the push buttons on panels 26, 27 and 28 are of the normally open type.

The self-propelled vehicle described hereinabove also includes support means for a beam to be transported by the vehicle. This includes a pair of beam support arms 32 mounted on vehicle base 1 for relative movement in respect of each other along a horizontal axis extending in the same direction as connector bar 13. The support arms are mounted on the base by means of horizontal bar 30 of polygonal, for instance hexagonal, cross section. The bar is journaled for rotation about its axis in side plates 29, 29 secured to base 1 and inner ends 31 of arms 32 carry bearings slidable along bar 30 and holding the arms on the bar for rotation therewith. Each beam support arm has a free end 38 defining a recess for receiving and supporting the axle of beam 39 to be transported by the vehicle. The support arms may be slid along bar 30 to adjust the spacing $e$ therebetween in correspondence to the length of the beam.

Hydraulic jacks 33, 33 pivot the support arms about a horizontal axis (see FIG. 3) to raise and lower the arms into desired positions, control lever 34 being provided for operating the hydraulic jacks. Each jack comprises hydraulic fluid operated piston rod 35 having an end linked by pivot pin 37 to one end of connecting lever 36 whose other end is non-rotatably secured to bar 30. Thus, when control lever 34 is operated by swinging it in the direction of arrow $c$ (see FIG. 3), hydraulic fluid will be supplied to jack 33 to reciprocate the vertically movable piston rod therein and thus to cause bar 30 to rotate about its horizontal axis and to cause support arms 32 to swing in the direction of arrow $d$ to raise the beam supported on the arms. When lever 34 is swung in the direction of arrow $e$, hydraulic fluid will be withdrawn from jack 33 and the support arms will be lowered.

In operation, the vehicle is driven and steered towards a beam to be transported so that the axis of the beam is parallel to axis X—X of the vehicle and space $l$ between support arms 32 is then adjusted to correspond to the length of the beam. One of the buttons on panel 27 is then operated to steer the vehicle in the direction Y to position support arm ends 38 just below the ends of beam 39, a fine adjustment being effected, if necessary, by pushing a button on panel 28 for proper positioning of the arms in respect of the beam. In this position, control lever 34 is operated to lift the beam supported on arms 32 above base 1 (see FIG. 3). The driving and steering controls may then be operated to transport the beam carried by the vehicle to any desired location.

The driving and steering controls may be readily operated by power supplied from a battery or batteries mounted on vehicle base 1 and the push button control of all vehicle motions makes it very easy to position the vehicle properly and accurately in respect of the beam for pick-up thereof. Steering in all desired directions is also made very easy by swingable steering shaft 20.

What is claimed is:

1. A power-operated vehicle for transporting a beam, comprising, in combination:
   1. a base having a front portion and a rear portion,
   2. a front wheel at the front portion and a rear wheel at the rear portion of the base,
      a. the front and rear wheels being independently driven,
   3. support shafts pivotal about a vertical axis and mounting the front and rear wheels on the base for pivoting the wheels about the vertical axis whereby the vehicle base is steered in the direction of the wheel pivoting,
   4. a connector bar interconnecting the support shafts for pivoting the shafts in unison,
   5. a steering shaft operably connected to one of the support shafts for pivoting the shaft in a direction transverse to the vertical axis thereof,
   6. a braking control means for the wheels carried by the steering shaft,
   7. control means for controlling forward and reverse motion as well as high and low speed motion of the wheels,
   8. another control means operatively associated with the other support shaft for controlling forward and reverse motion of the wheel supported by the other support shaft in low speed motion,
   9. freely rotatable rollers mounted on the vehicle base laterally offset from the front and rear wheels and forming a quadrangular wheeled support therefor,
   10. a pair of beam support arms mounted on the vehicle base for relative movement in respect of each other along a horizontal axis,
      a. each beam support arm having a free end defining a recess for receiving and supporting a beam to be transported upon movement of the support arms in respect of each other in correspondence to the length of the beam,
   11. hydraulic jack means for pivoting the support arms about the horizontal axis, and
   12. a control lever for operating the hydraulic jack means.

2. The power-operated vehicle of claim 1, wherein the base is an inverted channel member.

3. The power-operated vehicle of claim 1, wherein the steering shaft is operably connected to the support shaft mounting the rear wheel on the base.

4. The power-operated vehicle of claim 1, wherein the control means comprise panels respectively carried by the steering shaft and the other support shaft and push buttons mounted on the panels for controlling the forward, reverse, high and low speed motions, respectively.

5. The power-operated vehicle of claim 1, wherein the connector bar extends in the same direction as the horizontal axis.

6. The power-operated vehicle of claim 1, further comprising bevel gear means interconnecting the respective ends of the connector bar to the support shafts.

* * * * *